United States Patent
Barrett (12)

(10) Patent No.: US 6,782,471 B2
(45) Date of Patent: Aug. 24, 2004

(54) MANAGEMENT OF A DEVICE BASED ON MONITORING DURING AN INACTIVE STATE

(75) Inventor: Tony Barrett, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 670 days.

(21) Appl. No.: 09/728,688

(22) Filed: Dec. 1, 2000

(65) Prior Publication Data

US 2002/0083218 A1 Jun. 27, 2002

(51) Int. Cl.[7] .............................................. G06F 15/177
(52) U.S. Cl. ........................................ 713/1; 713/320
(58) Field of Search ................................ 713/1, 2, 100, 713/300, 320, 323

(56) References Cited

U.S. PATENT DOCUMENTS

| | | | | |
|---|---|---|---|---|
| 5,634,137 A | * | 5/1997 | Merkin et al. ................. | 710/10 |
| 5,912,621 A | * | 6/1999 | Schmidt ....................... | 340/571 |
| 6,092,135 A | * | 7/2000 | Kwon .......................... | 710/104 |
| 6,191,503 B1 | * | 2/2001 | Kitten et al. ................. | 307/112 |
| 6,289,456 B1 | * | 9/2001 | Kuo et al. .................... | 713/200 |
| 6,304,334 B1 | * | 10/2001 | Ueno .......................... | 358/1.13 |
| 6,519,698 B1 | * | 2/2003 | Leyda et al. .................. | 713/2 |
| 6,721,885 B1 | * | 4/2004 | Freeman et al. ............... | 713/2 |

* cited by examiner

Primary Examiner—Dennis M. Butler

(57) ABSTRACT

A method in accordance with one embodiment of the present invention provides for monitoring a device for a disturbance so as to detect a disturbance, wherein the monitoring occurs while the device is in an inactive state. The method further includes taking a first set of actions if a disturbance is detected during the monitoring, and taking a second set of actions if a disturbance is not detected during the monitoring. The second set of actions decreases the consumption of consumables by the device as compared to the consumption of consumables which would have occurred if, instead, the first set of actions had been taken.

19 Claims, 4 Drawing Sheets

MANAGEMENT OF A DEVICE BASED ON MONITORING DURING AN INACTIVE STATE

FIELD OF THE INVENTION

This invention relates generally to electronic devices and computer peripherals, and more particularly to management of such devices and peripherals.

BACKGROUND OF THE INVENTION

The power cycle for a typical printer, copier, facsimile or similar device is (1) activation (i.e., turn on) of the device; (2) use of the device; and (3) deactivation (i.e., turn off) of the device. In the deactived or inactive state, power may be entirely cut off to the device, or power may continue to be supplied to parts of the device. In the latter case, the inactive state is a low power "standby" or "power conservation" state.

When the power cycle transitions from the inactive to the active state, the device typically performs one or more initialization (e.g., calibration) routines. As one example of this, a color laser printer might undergo an automatic color calibration whenever it is turned on. This adjustment is necessary to allow the printer to adjust a variety of process control parameters (e.g., toner/carrier concentration, laser beam power, bias voltages, etc). This adjustment can require as long as several minutes. Automatic color adjustment is just one of many adaptive calibration procedures that can occur when a printer or similar device is activated. Other adaptive calibrations can respond to product age, ambient humidity, ambient temperature, etc.

Unfortunately, initialization routines are often needlessly performed. In most cases, a part or subsystem need not be recalibrated, if the part or subsystem has not been disturbed. However, known devices make a worst-case assumption that anything which possibly could have been disturbed has been disturbed. The effects of this assumption and the consequent unnecessary initialization routines are (1) wasted time for a user waiting for completion of these routines; (2) increased wear and tear on the parts exercised by the routines; and (3) increased consumption of power and consumables (e.g., toner and photoconductive drum).

SUMMARY OF THE INVENTION

In one respect, the invention is a method for use with a device (e.g., printer, facsimile, copier or scanner). The method monitors the device for a disturbance so as to detect the disturbance. The monitoring occurs while the device is in an inactive state (e.g., no power, low power or standby state). The method takes a first set of actions, if a disturbance has been detected during said monitoring, or a second set of actions, if a disturbance has not been detected during said monitoring. The second set of actions differs from the first set of actions. For example, the disturbance may be an opening of a door on the device. Optionally, the method also transitions the device from the inactive state to an active state. In one embodiment, the first set of actions comprises performing an initialization routine, such as an adaptive calibration routine, which is absent in the second set of actions. Optionally, the method may also store data regarding a detected disturbance.

In another respect, the invention is an apparatus. The apparatus comprises a sensor interface, a routine and logic. The sensor interface is connected to a sensor. The logic is connected to the sensor interface and the routine. The logic conditionally launches the routine depending upon the state of the sensor. The routine may be an initialization routine, and the logic may be a startup logic. Optionally, the apparatus also comprises the sensor, which may be a door access sensor, a motion sensor or a light sensor, for example. The apparatus may also comprise a memory connected between the sensor and the sensor interface. In some embodiments, the memory may be electronic or mechanical.

In yet another respect, the invention is a computer readable medium on which is embedded a computer program. The computer program comprises a sensor interface, a routine and logic, as described above.

In comparison to known prior art, certain embodiments of the invention are capable of achieving certain advantages, including some or all of the following: (1) decreased waiting time during device activation; (2) decreased wear and tear on the device; and (3) decreased consumption of power and consumables. Those skilled in the art will appreciate these and other advantages and benefits of various embodiments of the invention upon reading the following detailed description of a preferred embodiment with reference to the below-listed drawings.

DETAILED DESCRIPTION OF A PREFERRED EMBODIMENTS

Figure 1:
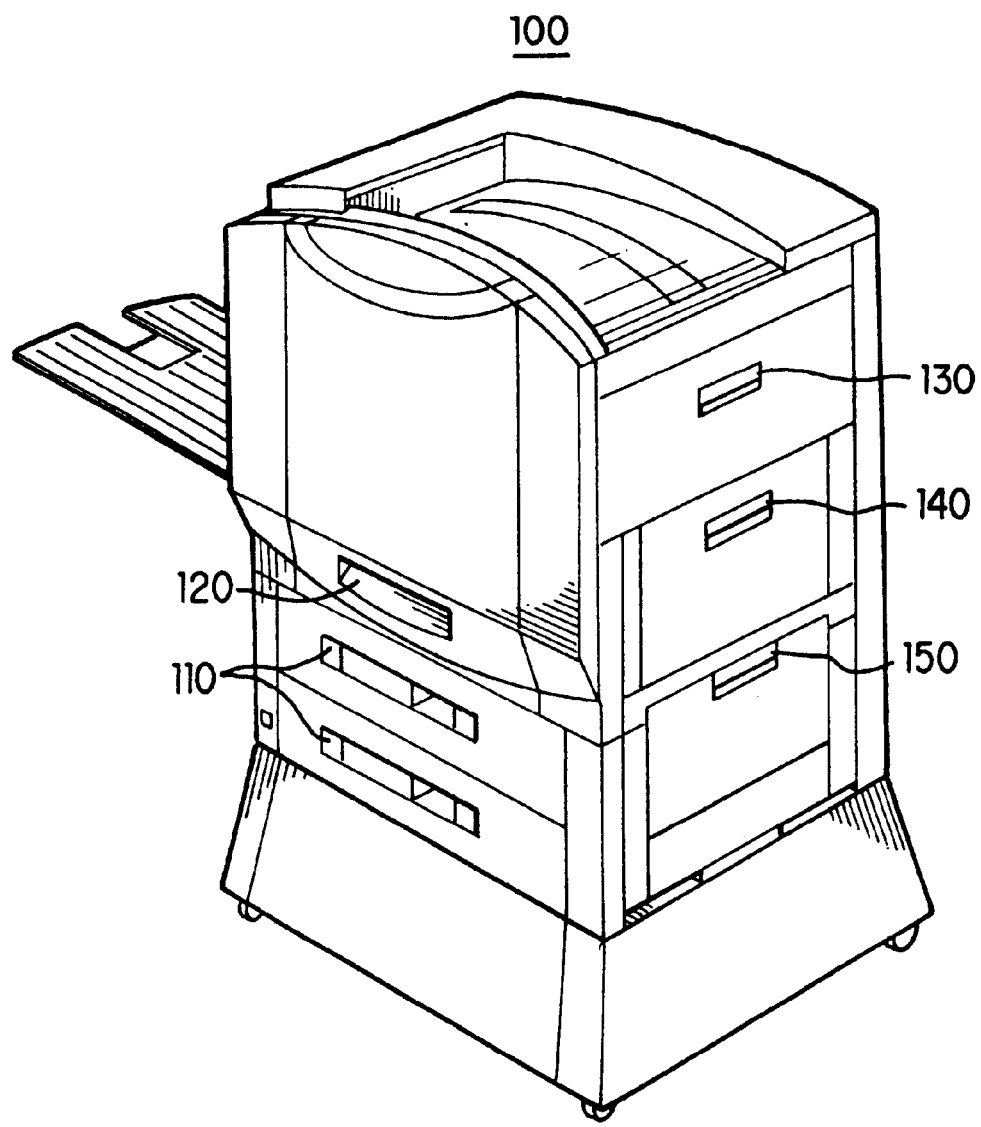
FIG. 1 depicts an illustrative device with which an embodiment of the invention is operable.

FIG. 1 depicts a printer 100 with which an embodiment of the invention is operable. The printer 100 is an illustrative device with which the invention can be used. Other examples include copiers, facsimile machines, scanners and the like, including combinations of the aforementioned. The printer 100 includes several access doors 110–150, visible from the perspective of FIG. 1; additional access doors on the back sides may also be present. The access doors 110–150 cover various components of the printer 100. Behind the access doors 110, for example, are paper supply trays. As another example, the access door 120 covers the toner cartridge. One or more of the access doors 110–150 is equipped with a sensor and memory element that detects and persistently stores the fact that the door has been opened.

Figure 2:
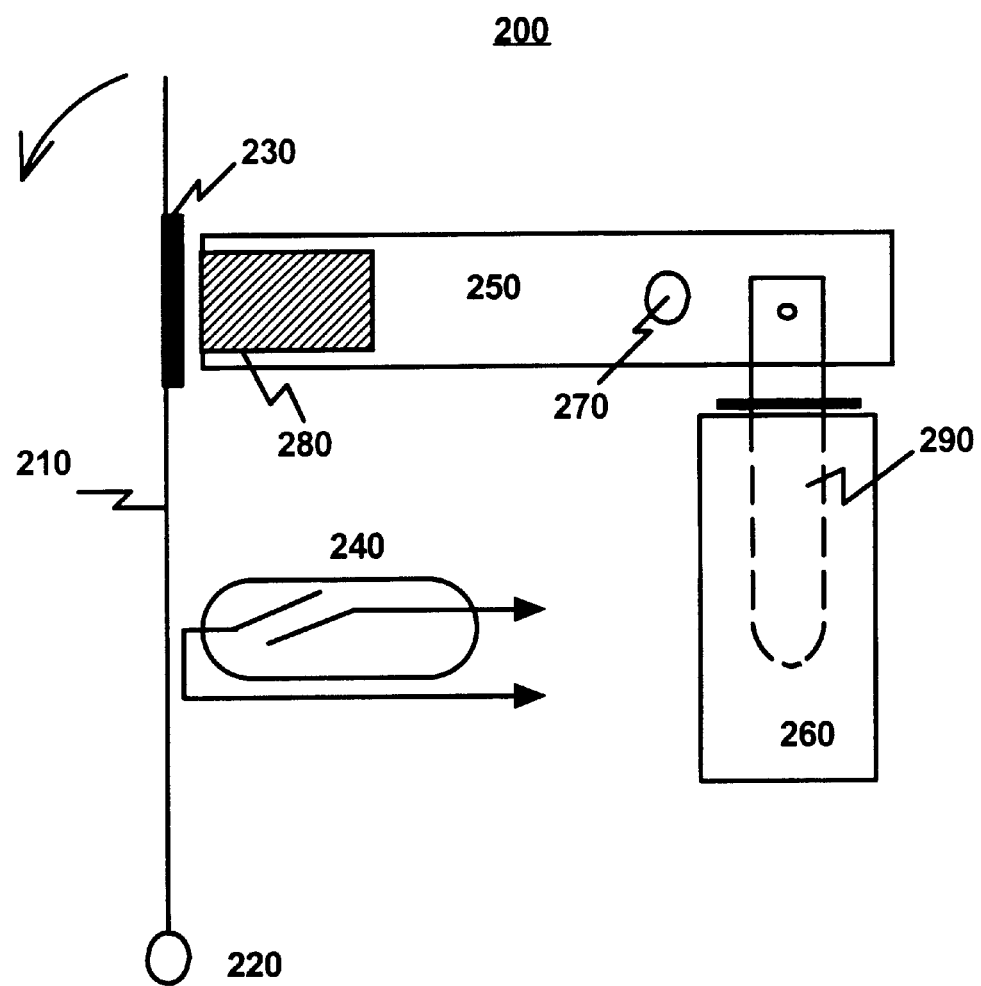
FIG. 2 depicts an illustrative door access sensor and memory element, according to an embodiment of the invention.

One illustrative door access sensor and memory mechanism 200 is depicted in FIG. 2, which is a side view of an access door 210. The access door 210 opens as shown by the arrow about a pivot point 220. Attached to the access door 210 is a ferrous metal plate 230 bonded to the inside surface of the access door 210. Inside the access door 210 is a reed switch 240, a lever arm 250 and a solenoid 260. The reed switch 240 is nominally open in the absence of a sufficiently strong magnetic field. The lever arm 250 has a pivot point 270. On its end proximate to the access door 210, the lever arm 250 is attached to or contains or is otherwise associated with a magnet 280. On the other end, the lever arm 250 is attached to a solenoid plunger 290. The solenoid 260 is initially unenergized so that the solenoid plunger 290 can move freely vertically.

The door access sensor and memory mechanism 200 operates as follows: Assume that the device on which the mechanism 200 resides is initially in an inactive state, and the access door 210 is initially closed. As the access door 210 remains closed, the magnet 280 is attracted to the ferrous metal plate 230. As the access door 210 opens, the distance between the magnet 280 and ferrous metal plate 230 increases, and the magnetic attraction between these two elements decreases. At some separation distance, the force of gravity on the magnet 280 exceeds the force of the magnetic attraction to the ferrous metal plate 230 and the left end (as shown) of the lever arm 250 falls, pivoting about the pivot point 270, until the magnet 280 eventually rests on or near the reed switch 240, causing the contacts of the reed switch 240 to connect. At this point, even if the access door 210 closes, the magnet 280 continues to rest on or near the reed switch 240 and the reed switch 240 remains closed. When power is applied to the device, control circuitry (not shown) can detect the condition of the reed switch 240. If the access door 210 was never opened, the reed switch 240 would remain open. If the access door 210 was opened one or more times in the inactive state, irrespective of whether the access door 210 is open or closed when power is reapplied, the reed switch 240 remains closed until the mechanism 200 is reset.

The mechanism 200 is reset by passing a current through the solenoid 260 as follows: After the condition of the reed switch 240 is checked, at some predetermined time when the access door 210 is most likely closed, the solenoid 260 is energized briefly. Current flowing though the windings of the solenoid 260 generates a magnetic field to attract the solenoid plunger 290, thereby pulling down on the right end (as shown) of the lever arm 250, causing the lever arm 250 to rotate clockwise about the pivot point 270. This action, in turn, lifts the magnet 280 to a position where it is once again attracted to the ferrous metal plate 280 with sufficient force to hold the lever arm 250 horizontal even after current flow through the solenoid 260 ceases. As the magnet 280 lifts off the reed switch 240, the reed switch 240 opens, confirming that the mechanism 200 is fully reset.

Several variations of and alternatives to the mechanism 200 are possible. For example, rather than relying solely on the force of gravity to cause the magnet 280 to fall towards the reed switch 240 as the door 210 is opened, various springs can be attached to various parts to more positively induce the desired motion(s) (e.g., a tension spring could be used to pull the left end of the lever arm 250 towards the reed switch 240 as the access door 210 is opened). As another example, the lever arm 250 in the tripped position could just as easily prevent a light beam from reaching a photo detector when power is reapplied instead of allowing the magnet 280 to activate the reed switch 240. Numerous other implementations could easily be envisioned by those skilled in the art. For example, a low power electronic memory could be powered during the inactive state, and this memory could store a flag that the access door 210 was opened. Unlike such an electronic memory, the mechanism 200 utilizes a mechanical memory and does not require power during the inactive state. As another example, the sensor could be a simple photodetector located inside the access door 210 and connected to an electronic memory, provided that the interior is nominally dark when the access door 210 is closed and that a person would normally open the door for service in lighted conditions. As yet another example, the sensor could be a solar cel and the memory element could be a capacitor connected across the solar cell. Any voltage developed on the capacitor would indicate that the access door 210 had been opened.

Figure 3:
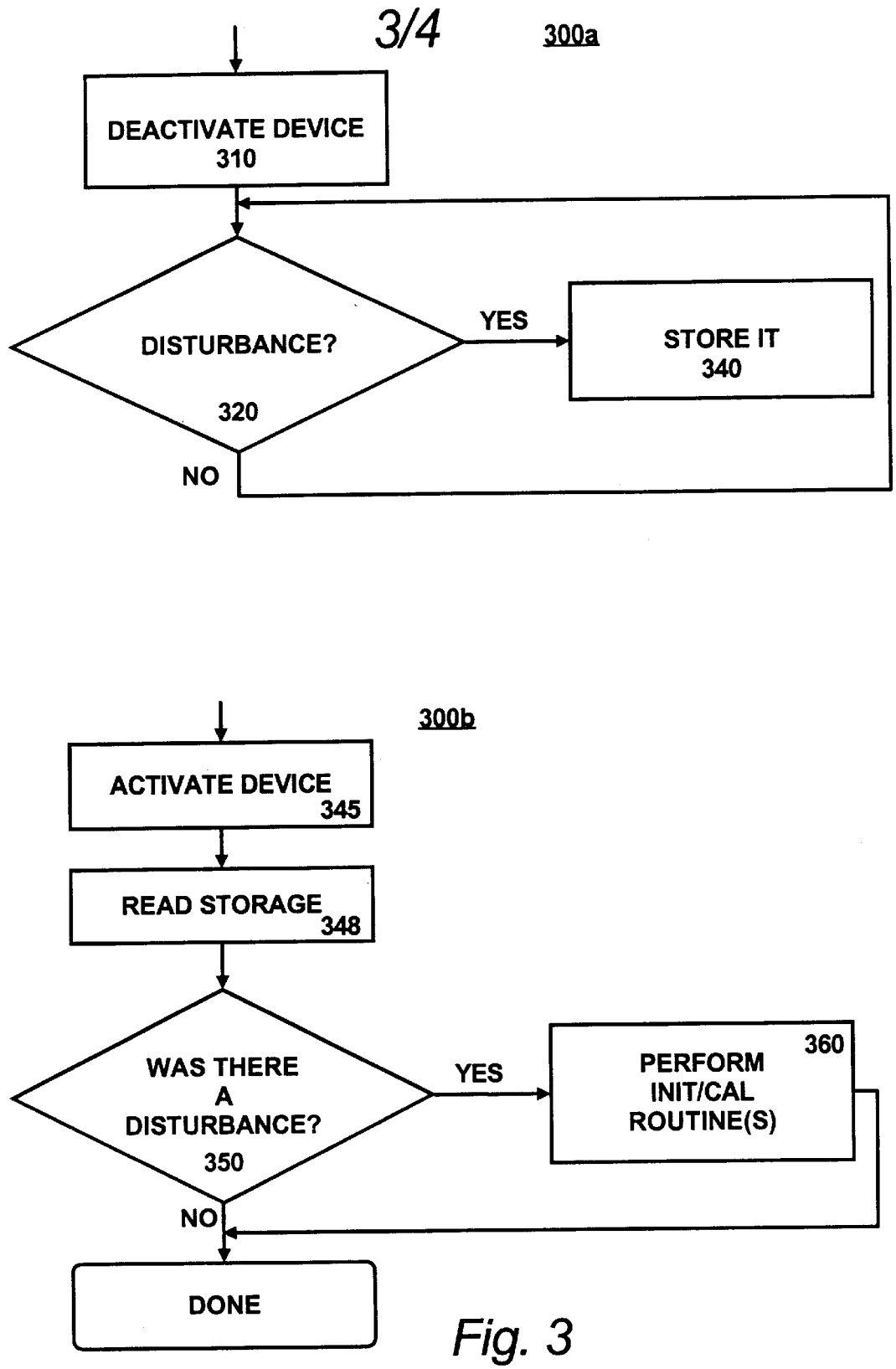
FIG. 3 is a flowchart of a method according to an embodiment of the invention.

FIG. 3 is a flowchart of a method 300 according to an embodiment of the invention. The method 300 has two parts—a monitoring method 300a and a reaction method 300b. The monitoring method 300a begins when the device is deactivated (310). In an inactive state, the monitoring method 300a performs a repetitive loop of detecting (320) disturbances. The detected disturbance can take different forms in different embodiments: for example, opening of an access door or movement of a component. If a disturbance is detected (320), then the method 300 memorizes (340) at least the fact that the disturbance occurred and possibly other information about the disturbance. The memorizing step 340 may be performed every time a disturbance is detected (320), only the first time or only selected times (i.e., when some other condition is met).

The reaction method 300b begins when the device is activated (345). After activation (345), the reaction method 300b reads (348) the memory where the memorizing step 340 was effective and tests (350) whether a disturbance has been memorized. If so, then the reaction method 300b performs (360) appropriate initialization (e.g., calibration) routine(s). If not, the method 300b terminates without performing those routine(s), thus saving time, wear and tear, and consumables. In some embodiments, the reaction method 300b may still perform different initialization routines if no disturbance has been memorized, but the initialization routines in that case are simpler, quicker and consume less supplies.

The reaction method 300b can be varied in many ways. First, the performing step 360 need not involve initialization routines; other actions may or may not be performed (360) depending upon whether a disturbance has been detected. Such other actions need not occur at or near a time when the device transitions from an inactive to an active state (i.e., not necessarily "initialization" routines). More generally, if disturbance information, or lack thereof, is recorded, the device can make more intelligent decisions about what should be done to account for the various disturbances at a later time. As an example of an alternative embodiment, the performing step 360 may increment a running count of how many times a door has been opened. This count can be utilized to make more intelligent product revisions. For example, depending upon an open count, a complex, costly, user-friendly latch might be replaced with a simple screw—or vice versa—in the next product revision.

In another variation, the monitoring method 300a and the reaction method 300b are performed in a more direct succession. For example, the memorizing step 340, the activation step 345, the reading step 348 and the disturbance testing step 350 can be eliminated. In this case, the method 300 performs (360) the conditional actions soon after detecting a disturbance, without waiting for a state transition from inactive to active.

As a final note regarding the method 300, the monitoring method 300a can be oriented to detect and react to one particular type of disturbance. In any given device, several instances of the method 300a may be running concurrently, one for each possible type of disturbance. Corresponding to each instance of the monitoring method 300a can be an instance of the reaction method 300b, so that each possible disturbance is reacted to independently. Alternatively, one or more instances (perhaps just a single instance) of the reaction method 300b can run, taking conditional action based on some combination of multiple different disturbances monitored respectively by multiple instances of the monitoring method 300a.

Figure 4:
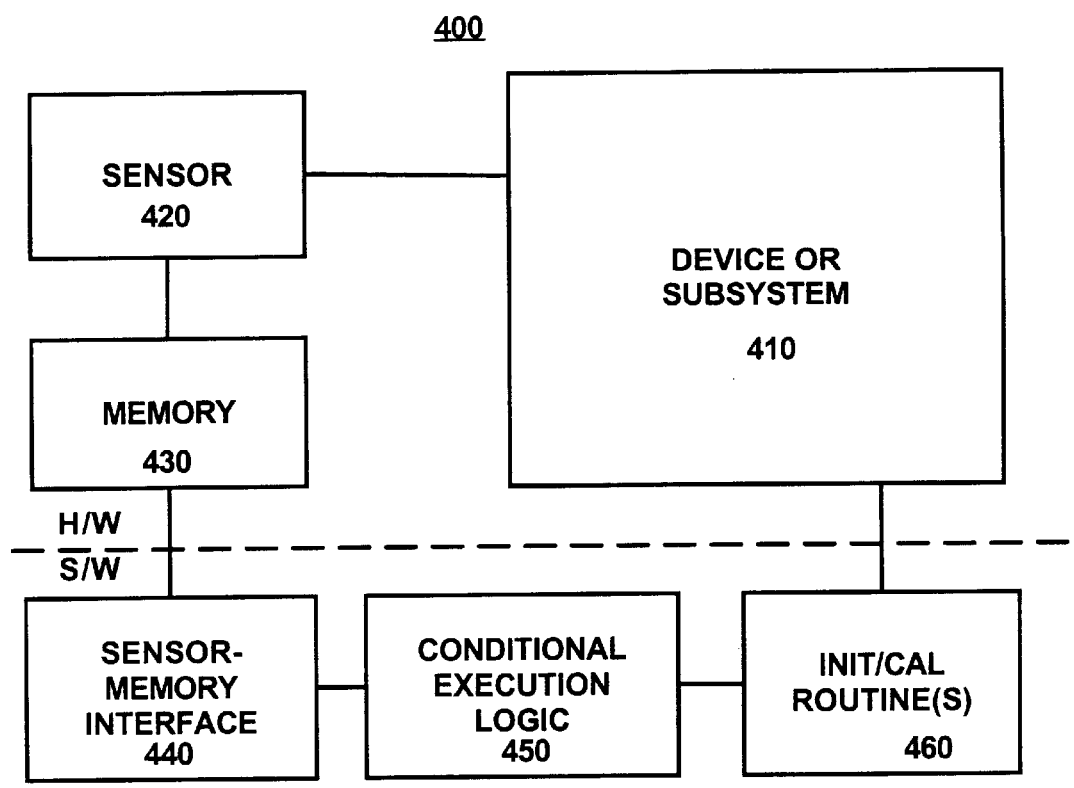
FIG. 4 is a block diagram of an apparatus according to one embodiment of the invention.

FIG. 4 is a block diagram of an apparatus 400 according to one embodiment of the invention. The apparatus 400 comprises the objects that perform the method 300. The objects are typically hardware (shown above the dashed line) and software modules (below the dashed line). The hardware includes a device or subsystem 410, a sensor 420 and a memory 430. The software modules include a sensor-memory interface 440, conditional execution logic 450 and an initialization (e.g., calibration) routine(s) 460. The sensor 420 detects disturbances to the device or subsystem 410. The memory 430 stores information regarding the disturbances detected by the sensor 420. The sensor 420 and the memory 430 may be separate or integrated together. The sensor-memory interface 440 reads the data stored in the memory 430. The conditional execution logic 450 launches some or all of the initialization routine(s) 460, depending upon the information stored in the memory 430. In the simplest embodiment, the conditional execution logic 450 either launches the initialization routine(s) 460, if the device or subsystem 410 was disturbed, or does not launch the initialization routine(s) 460, if the device or subsystem 410 was not disturbed, thereby saving time, wear and tear, and consumables.

Various parts (e.g., the sensor 420, the memory 430, the logic 450) of the apparatus 400 can be pre-existing components of the device 100. As an example, many of the printer doors 110–150 already have sensors. Utilization of pre-existing parts can be desirable for economic, space saving, or other purposes. Rather than adding additional sensors to monitor doors in a no or low power state, existing sensors or circuitry can be modified to work as described above. Conversely, sensors installed to monitor disturbances that might occur in a no or low power state can also be utilized as standard sensors when the device 100 is in an active state. If a sensor does double duty, costs can be minimized, space saved, and additional active features added.

The apparatus 400 can be varied in numerous ways. First, the initialization routines 460 need not concern initialization, and the conditional execution logic need not be startup logic, as explained above. Second, the memory 430 is optional in some embodiments. Other variations are within the scope of one of ordinary skill in the art.

The software modules 440–460 can exist in a variety of forms both active and inactive. Although the software modules 440–460 are typically software, they may be firmware or hardware or some combination of software, firmware and hardware. As software, the modules 440–460 can exist in the form of source code, object code, executable code or other formats. As hardware, the modules 440–460 can take the form of hardware description language (HDL) files. Any of the above can be embodied on a computer readable medium, which include storage devices and signals, in compressed or uncompressed form. Exemplary computer readable storage devices include conventional computer system RAM (random access memory), ROM (read only memory), EPROM (erasable, programmable ROM), EEPROM (electrically erasable, programmable ROM), and magnetic or optical disks or tapes. Exemplary computer readable signals, whether modulated using a carrier or not, are signals that a computer system can be configured to access, including signals downloaded through the Internet or other networks. In a sense, the Internet itself, as an abstract entity, is a computer readable medium. The same is true of computer networks in general.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims—and their equivalents—in which all terms are meant in their broadest reasonable sense unless otherwise indicated.

What is claimed is:

1. A method for use with a device, the method comprising:

monitoring the device for a disturbance of an access door so as to detect the disturbance of the access door, wherein said monitoring occurs while the device is in an inactive state;

taking a first set of actions, if a disturbance of the access door is detected during said monitoring; and taking a second set of actions, if a disturbance of the access door is not detected during said monitoring, wherein taking the second set of actions decreases the consumption of consumables by the device as compared to the consumption of consumables which would have occurred if instead the first set of actions had been taken.

2. The method of claim 1 wherein the inactive state is selected from a group consisting of a low power state and a standby state.

3. The method of claim 1 further comprising:

transitioning the device from the inactive state to an active state.

4. The method of claim 1 wherein the first set of actions comprises performing a first set of initialization routines, and the second set of actions comprises performing a second set of initialization routines.

5. The method of claim 1 wherein the first set of actions comprises performing a routine which is absent in the second set of actions.

6. The method of claim 5 wherein the first set of actions comprises performing an adaptive calibration routine and the second set of actions lacks performing the adaptive calibration routine.

7. The method of claim 1 further comprising:

storing data regarding a detected disturbance of the access door.

8. The method of claim 1 wherein the device is selected from a group consisting of a printer, a facsimile, a copier and a scanner.

9. An apparatus comprising:

a sensor configured to monitor the apparatus and to detect an opening and closing of an access door which occurs while the apparatus is in an inactive state;

a memory connected to the sensor and configured to store data indicating whether the sensor detected that the access door was opened and closed;

a sensor-memory interface connected to the memory and configured to read the stored data;

an adaptive calibration routine; and logic connected to the sensor-memory interface and the adaptive calibration routine, wherein the logic conditionally launches the adaptive calibration routine depending upon a state of the sensor.

10. The apparatus of claim 9 wherein the sensor is selected from the group consisting of a motion sensor and a light sensor.

11. The apparatus of claim 9 wherein the memory is selected from a group consisting of an electronic memory and a mechanical memory.

12. The apparatus of claim 9 further comprising:
a device to which the sensor is connected.

13. The apparatus of claim 12 wherein the device is selected from a group consisting of a printer, a facsimile, a copier and a scanner.

14. An apparatus comprising:
a sensor configured to detect an opening and closing of an access door which occurs while the apparatus is in an inactive state;
a memory connected to the sensor, wherein the memory is configured to store data indicating whether the sensor detected that the access door had been opened and closed;
a sensor-memory interface connected to the memory, wherein in operation the sensor-memory interface reads the data stored in the memory; and
conditional logic connected to the sensor-memory interface, wherein in operation the conditional logic launches at least some part of an initialization routine in response to the data stored in the memory.

15. The apparatus of claim 14 wherein the memory is configured to increment a running count of how many times the access door has been opened.

16. The apparatus of claim 14 further comprising:
a device to which the sensor is connected.

17. The apparatus of claim 16, wherein the device is selected from a group consisting of a printer, a facsimile, a copier and a scanner.

18. An apparatus comprising:
a sensor configured to detect a disturbance of an access door which occurs while the apparatus in an inactive state;
a memory connected to the sensor and configured to store information regarding whether the access door has been disturbed;
a sensor-memory interface connected to the memory and which in operation reads the information stored in the memory which indicates whether the access door has been disturbed; and
conditional logic connected to the sensor-memory interface, wherein the conditional logic is configured to launch a first set of actions if the information stored in the memory indicates that the access door has been disturbed, and to launch a second set of actions if the information stored in the memory indicates that the access door has not been disturbed, and wherein performing the second set of actions consumes less supplies than does performing the first set of actions.

19. The apparatus of claim 18, wherein the memory comprises a reed switch which is configured to close if the access door is disturbed, and wherein the closed reed switch persistently stores the fact that the access door has been disturbed until the reed switch is reset to an open position.

* * * * *